Oct. 2, 1956 S. O. DORST 2,765,267

INSULATION FILMS

Filed Nov. 19, 1953

STANLEY O. DORST

INVENTOR.

BY Arthur G. Connolly
his attorney

United States Patent Office 2,765,267

Patented Oct. 2, 1956

2,765,267

INSULATION FILMS

Stanley O. Dorst, North Adams, Mass., assignor to Sprague Electric Company, North Adams, Mass., a corporation of Massachusetts Application November 19, 1953, Serial No. 393,067

12 Claims. (Cl. 204—1)

Figures 1, 2:
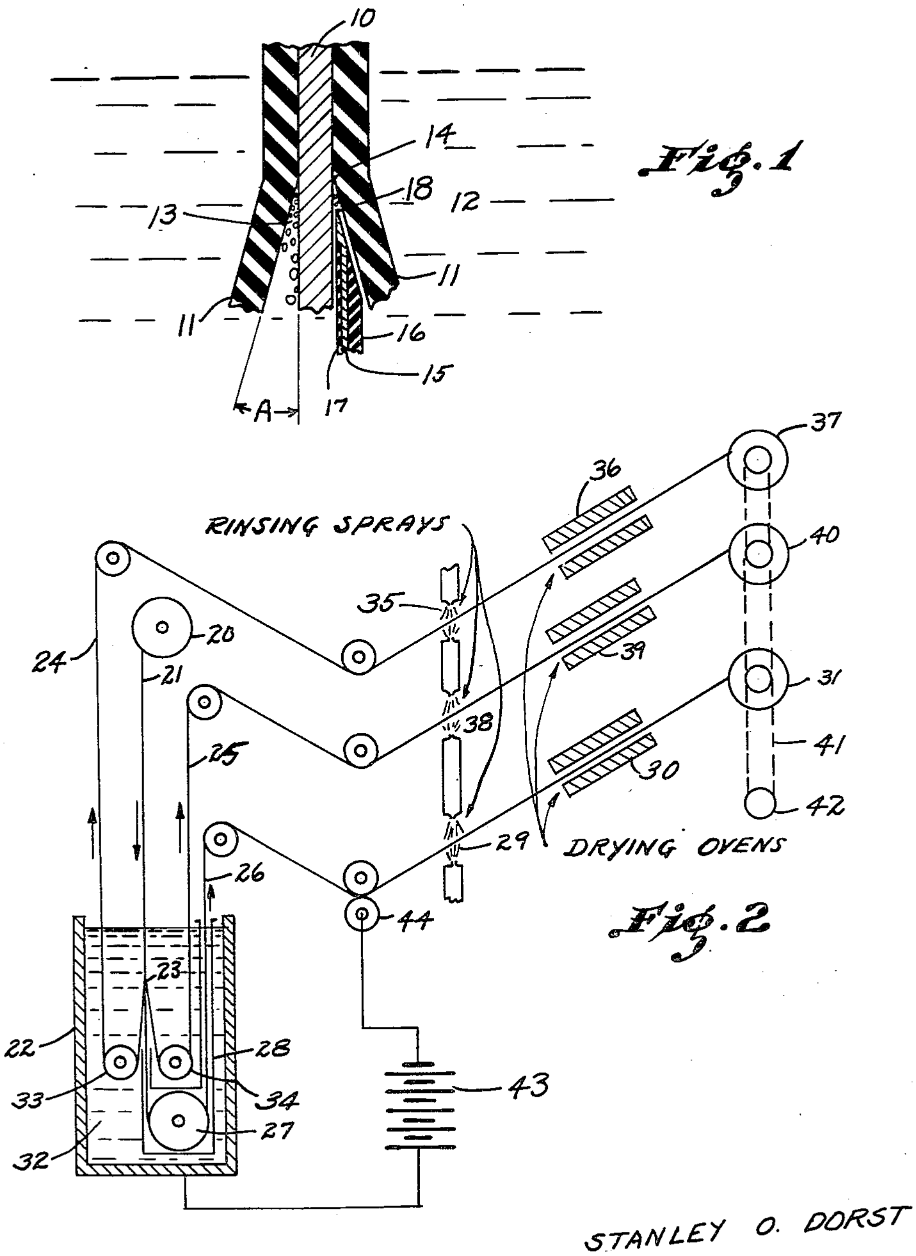

This invention relates to an improved process for producing thin films of plastic materials and more specifically refers to a process for stripping thin flexible films of resins which adhere to underlying metal bases, to produce unsupported dielectrics. This application is a continuation-in-part of my copending application Serial No. 64,123, filed December 8, 1948.

The increased demand for higher temperature dielectric materials has resulted in the development of a number of suitable insulating resins, inorganic substances, and combinations thereof which may be subjected to temperatures on the order of 200° C. or more without failure. Representative of these materials are the polytetrahaloethylene resins, such as polytetrafluoroethylene, highly cross-linked polyethylene, halogen substituted cross-linked vinyls, and the thin flexible ceramic insulating layers such as described in United States Patents 2,386,384 and 2,421,652.

The resinous materials mentioned above are extremely flexible, durable, and generally insoluble in common solvents. The preparation of thin flexible films therefrom is, however, very difficult, because of these very desirable properties. The material is not easily molded or extruded and cast films cannot be made since there is no solvent therefor. As a result, thin films have been prepared by shaving a thin layer from a massive block or cylinder of the material. It is difficult to obtain uniform film thickness by this process and, at best, the thickness of the film is greater than .001". Films of such thickness are not particularly useful, for example, in the manufacture of electrical condensers which normally employ individual spacers of thicknesses on the order of .0003". For low voltage operations it is not necessary to employ dielectric thicknesses much greater than .0005", and as a result the use of the known polytetrafluoroethylene films as dielectric spacers results in a greatly increased condenser size and cost.

On the other hand, the flexible predominantly ceramic films referred to in the aforementioned patents can be produced on conductors in thicknesses varying from about .0001" to .001" and higher. The most flexible and satisfactory types, such as described in the above patents, are, however, relatively adherent to the underlying metal material. Many applications are possible because of this unusual adherence. If it is desired to produce thin flexible films of such dielectric material apart from the base metal upon which they are formed difficulties are encountered. It is extremely difficult to strip the dielectric film from the metal without tearing and destruction of the dielectrics.

It is an object of the present invention to overcome the foregoing and related disadvantages. A further object is to produce a thin flexible high temperature film by a simple and inexpensive process. A further object is to remove high temperature dielectric films from underlying metal bases to which the films adhere, without ap- Additional objects will become apparent from the following description and claims.

I have discovered that adherent resin and/or ceramic insulating layers may be removed from underlying bases by an electrolytic process in which the base metal is made the cathode in an electrolytic cell, and the insulating layer is forced off the base metal by the pressure of gaseous hydrogen at the junction between metal and insulation. The electrolyte employed in the process is an aqueous solution of an electrolyte, preferably an alkali group base such as sodium hydroxide and potassium hydroxide. However, a number of acidic electrolytes may be employed with many of the base metals which are used as cathodes in the process. I maintain as high a current density as is practicable, at a voltage at least equal to the decomposition voltage of water. As a limited embodiment of the invention, there is also added to the electrolyte solution a detergent which does not affect the electrochemical operation of the system, but which accelerates the wetting of the surfaces of the cathode.

In order to maintain a high pressure level at the generating interface, I have discovered that the stripping angle, that is, the angle between the base metal surface and the plane of the film being stripped, should be between about 1 degree and about 15 degrees. Preferably, the stripping should take place in a downward direction and at a point in the electrolyte wherein the hydrostatic pressure is relatively high. Dut to the confining action of the base metal and the impervious dielectric film, and to the hydrostatic pressure of the electrolyte, the hydrogen generated builds up appreciable pressure before it can escape to the surface of the electrolyte. It is to be understood, however, that the hydrogen pressure at the cathode in areas from which the dielectric film has been stripped, but which areas are still immersed in the electrolyte, may be negligible.

As preferred electrolytes, I have mentioned potassium hydroxide and sodium hydroxide dissolved in water. In the case of sodium hydroxide the concentration should be from about 5% to about 20% while in the case of potassium hydroxide the concentration should be from about 8% to about 25%. Other electrolytes which can be used include sulfuric acid in concentrations between about 3% and about 18%, acetic acid, boric acid, oxalic acid, and so forth. The caustic electrolytes are preferable; however, since they do not deposit anodically, since they are good wetting agents, and since they may be used without loss or deterioration so that the only additions required are water. In any event, the electrolyte should be such that cations will not deposit on the cathode preferentially to hydrogen. In a general sense, the electrolyte should have a decomposition potential exceeding that of water.

As base metals I prefer to use cooper but have found that iron, nickel, cobalt, various steels and alloys of these materials are satisfactory. In many instances flexible stainless steel sheets with nickel or copper plated surfaces are outstanding.

The anode in the electrolytic stripping cell is preferably carbon, but nickel, cobalt, stainless steel and the like are useful for this purpose. The anode should not go into solution under the conditions at which the cell is operated.

Resins for use with the invention are those which are insoluble in the common solvents or plasticizers, flexible in character but fusible only at highly elevated temperatures and in film form exhibit excellent dielectric properties. Among these resins particularly suited for the preparation of thin dielectric films by my process are:

The polytetrahaloethylenes, as polytetrafluoroethylene and polytrifluoromonochloroethylene;

at slightly elevated temperatures (60° C.) resulting in a polymer of moderate cross-linking (1 to 3%); and Halogen substituted cross-linked vinyls, as a copolymer of styrene with 1,4-divinyl tetrachlorobenzene; a copolymer of styrene with 2,4,6-trivinyltrichloro benzene; and copolymer of pentachlorostyrene-2,4,6 trivinyltrichlorobenzene.

Other resins indicative of the scope and utility of my invention are:

Long chain alkyl acrylates cross-linked with polyfunctional compounds; polybutadiene having 1 to 3% cross-linking as well as styrene-butadiene copolymers substantially cross-linked; and the copolymers of methyl methacrylates with polyfunctional compounds such as diallyl phthalate, diallyl maleate, resorcinol dimethacrylate, crotyl methacrylate, polyethylene glycol dimethacrylate, all of which yield cross-linked insoluble substances.

It should be pointed out that the cross-linked polymers and copolymers should be cross-linked to a degree of 5% or less with a preferred range of 1 to 3% in order to obtain flexible rather than brittle films which result if much cross-linking occurs.

The resins are best prepared for electrophoretic deposition by emulsion or suspension polymerization methods whereas bulk polymerization followed by mechanical fracturing of the resin yields coating systems fraught with much difficulty as stable suspensions or dispersions are not readily prepared therefrom.

The invention will be further described with reference to the appended drawing in which:

Figure 1 shows a cross-section of a dielectric film being stripped from an underlying base metal, and Figure 2 shows a schematic arrangement of process equipment which may be employed in accordance with the invention.

Referring more specifically to Figure 1, 10 represents the base metal from which dielectric film 11 is being stripped. 12 represents the electrolyte in which water is being decomposed to evolve hydrogen at the cathodically-connected base surface of base metal 10; the hydrogen appears in the electrolyte in the form of bubbles such as shown at 13. The stripping junction line is indicated at 14. Angle A represents the primary stripping angle, preferably between about 1 and about 15 degrees as aforesaid, between the base metal surface and the surface of the stripped dielectric film, as it is first removed from the metal base. For practical purposes the distance from the unstripped film junction to the point or line determining the plane of the film is from about 0.1" to about 1.00", depending upon the depth of the stripping junction, viscosity of the electrolyte, etc. 15 represents the stripping anode, which would be used in place of the anodically connected container of Figure 2. The surfaces of anode 15 are completely insulated with insulation 16 and 17 except for section 18, which is maintained near the stripping line. By this means very high current densities can be obtained at the stripping line, with a resulting increase in effectiveness of the process. Further, the hydrogen formation at exposed surfaces of the metal foil in other parts of the cell is substantially eliminated. The desired hydrogen pressure is readily developed with the arrangement shown.

The metal foil, after rinsing and drying, may be led to a coating cell where it will be coated with the dielectric coating and then returned to the stripping cell in a continuous process arrangement.

Referring now to Figure 2, 20 represents the supply spool from which insulation coated foil 21 is unwound. The foil passes into stripping cell 22 and at stripping junction 23 is divided into metal base foil 26 and dielectric films 24 and 25. The foil passes out of the cell through insulating shielding enclosure 28 which contains reversing pulley 27. This enclosure serves to prevent excessive formation of hydrogen on the stripped surface of the metal cathode where it would serve no useful purpose. After leaving cell 22, foil 26 passes through rinsing spray 29 and drying oven 30, after which it is wound onto drive spool 31. The foil 26 is then ready for re-use. Dielectric film 24 passes around reversing pulley 33 and out of the cell to rinsing spray 35 and drying oven 36, respectively. Thereafter the film is wound onto drive spool 37. Dielectric film 25 passes around reversing pulley 24 and is then rinsed at 38 and dried in oven 39. It is wound onto drive spool 40. Drive spools 37, 40 and 31 are rotated at a more or less constant speed by chain 41, from driving gear 42. Of course, variations in sprocket diameters, etc. may be made to adjust for the differences in thickness between the films and the metal foil, etc., as desired.

Stripping cell 22 consists of a conductor connected as the anode to power supply 43. Nickel plated steel, carbon, and other materials hereinbefore referred to may be used for this purpose. Electrolyte 32 fills cell 22 and covers junction point 23, preferably by at least six inches. The oxygen which forms on the anode container walls may be allowed to escape or, along with the hydrogen, may be collected for by-product use. The negative side of the power supply 43 is connected to foil 26 by means of a contact roller 44.

It is apparent that numerous modifications of the apparatus described in Figure 2 may be made within the scope of the present invention. For example, the stripping anode of Figure 1 may be used.

Cutting knives may be installed in the stripping cell to cut the edges of the stripped film, thus separating them, if there is any tendency for them to tear away from one another unevenly. These cutting knives would act as slitters for the two films, and where desired, could be supplemented with additional knives to slit the stripped film into desired widths.

As pointed out earlier, the stripping of the film takes place in an electrolyte wherein the decomposition voltage of water is below the decomposition voltage of any other materials present. The operating voltage therefore need be only on the order of two volts, but the current density should be held at a high level at the stripping point of line, e. g. from about 1 to about 200 amperes per square inch, or higher. It is naturally difficult to express the actual current density in terms of area since the stripping action occurs on a line or plurality of points, rather than over a large and defined area.

In starting the stripping operation it is, of course, necessary to mechanically strip a portion of the dielectric in order to provide a point of exposed metal upon which the electrolytic action can take place. Once started, however, the process may be continued indefinitely so long as the current flow is continued.

As specific examples of the process of the invention, the following experiments are representative.

*Example 1*

A copper foil, 1" wide and 0.002" thick was passed through a suspension of polytetrafluoroethylene particles in water, the solids concentration being about 55%. The dipped foil was immediately passed through an oven held at about 360° C., where the water was removed and the particles sintered together to form an impervious dielectric coating of thickness about 0.00035". The coated copper foil was then passed through a stripping cell, the leading edge being initially stripped by scraping with a knife. The rate of travel was 20 feet per minute. The electrolyte consisted of a solution of 160 grams KOH per liter water. The stripping anode was a nickel plated steel container for the electrolyte. The stripped foil was shielded from the anode so that the major portion of the hydrogen evolution was at the stripping line. The stripping angle was about 12 degrees. The voltage was held at about 2.1 and the current at about 2 amperes. The stripped dielectric film was clear and impervious to water.

*Example 2*

A copper foil 1" wide and 0.002" thick was passed through an electrophoretic cell, such as shown in Figure 1 of United States Patent 2,386,634, containing a suspension of 314 grams $TiO_2$ and 52 grams polytrifluorochloroethylene in 300 cc. water, the foil being connected as the anode. The rate of travel was 30 feet per minute, with the voltage being held at about 5 volts and the current density on the two linear inches of foil exposed to the cathode being held at about 1.1 amperes per square inch. The coated foil was heated to about 290° C. to remove the water from the coating and to fuse adjacent resin particles together. A tough, opaque dielectric film was obtained. The coated foil was then passed through the stripping cell, as described in Example 1. The electrolyte was a solution of 120 grams NaOH per liter of water. The stripping angle was about 3 degrees and the rate of foil travel about 30 feet per minute. The voltage was maintained at about 2.5 volts and the current at about 5 amperes. The stripped film was tough, opaque and impervious to water. The $TiO_2$ content was about 85%, the balance being the polytrifluorochloroethylene binder.

*Example 3*

The coating suspension of Example 2 was replaced by the cross-linked copolymer of styrene with 1,3,5-trivinyl 2,4,6-trichlorobenzene in an emulsion containing 25% solids by weight. The resinous emulsion was prepared by mixing 98 grams of styrene, 2 grams of 1,3,5-trivinyl 2,4,6-trichlorobenzene, 180 grams of water, 5 grams of silica free soap flakes and .3 gram of potassium persulfate which system was thereafter stirred and held at a temperature of from 45° C. to 50° C. for 14 hours.

By the procedure set forth in Example 2 except that two passes through the coating cell were used instead of one, each pass being followed by sintering, a tough clear film about 0.00065" thick resulted.

*Example 4*

With the procedure of Example 2 a clear reddish colored film of the cross-linked copolymer of trivinyl trichlorobenzene with n-vinyl carbazole was prepared from an emulsion of this resin having 45% solids by weight. The emulsion was prepared by decanting the water from the product resulting from the emulsion polymerization of 4 grams of 1,3,5-trivinyl 2,4,6-trichlorobenzene and 200 grams of n-vinyl carbazole in 650 grams of water and catalyzed with potassium persulfate. The reaction was for 16 hours at 45–50° C.

*Example 5*

The coating emulsion of Example 2 was replaced by 50% solids by weight emulsion of polymerized, alkali persulfate catalyzed, polyethylene (United States Patent No. 2,388,225). A tough milky self-supporting film was produced.

*Example 6*

A nickel plated steel foil, 1" wide and 0.01" thick, was passed through an electrophoretic coating apparatus, such as shown in Figure 3 of United States Patent 2,421,652. The initial electrophoretic deposit was made from an aqueous suspension of 185 grams talc, 185 grams china clay and 27 grams zinc oxide in a liter of water. Also dissolved in the water was 70 grams of a 40% sodium silicate water solution, representing about 5% by weight. The foil was run at a speed of 120 feet per minute, with 2 linear inches of foil exposed to the electrophoretic action, current density of about 1.8 amperes per square inch. Following the deposition, the foil was passed through an oven held at about 600° C. to sinter the adjacent particles together. Thereafter, the foil was passed through a second electrophoretic cell, containing a suspension of 55% polytetrafluoroethylene particles in water. The linear deposition area was 2 inches, with a current of 3.2 amperes being applied. The resin particles were thus electrophoretically impregnated into the porous ceramic coating. After leaving the second electrophoretic cell, the foil was passed through an oven held at 370° C., to sinter the resin particles together. The foil was then passed through a stripping sell, such as described in Example 1 above, the electrolyte being a 10% solution of NaOH in water. 0.5% sodium lauryl sulfate was added to increase the wetting rate. The current was held at about 4 amperes and the voltage at about 2.1 volts. The stripping angle was 12 degrees. The stripped film was about 0.00055" thick, opaque and tough. It was impervious and resistant to water.

While the use of alkali group bases had been described in the above examples, it should be realized that acids may likewise be employed, particularly with the resinous dielectrics or where the rate of foil travel is such that the ceramic material will not appreciably dissolve in the electrolyte. All of the films described above may be used at 200° C. without failure. The ceramic resin films of Examples 2 and 3 are particularly resistant to thermoplastic flow under pressure at 200° C. and at lower temperatures.

It is to be understood that the invention may be applied to numerous other resin and resin ceramic insulating films. However, with the high temperature films, existing methods are particularly unsatisfactory and the present invention has particular utility therewith.

My invention represents a complete departure from earlier electrolytic cleaning and $H_2$-$O_2$ forming processes. In the first instance the electrolytic cleaning method is dependent upon a loose oxide scale, which is thrown off by the evolution of hydrogen. In the latter instance hydrogen is generated under atmospheric pressure and does not perform any work function during its release from the electrode surface.

According to my invention, optimum stripping results can be attained by maintaining a stripping angle between about 1 degree and 15 degrees, by stripping in a downward direction and by employing electrolyte hydrostatic pressure and disposition properly. The viscosity of the electrolyte will effect the hydrogen pressure developed at the stripping junction, as more viscous electrolytes will trap evolved hydrogen with greater effectiveness. Optimum stripping can be obtained when the stripping junction is at least 6" below the surface of the electrolyte, and preferably the distance is at least 1 foot.

As many apparently widely different embodiments of this invention may be made without departing from the spirit and scope hereof, it is to be understood that the invention is not limited to the specific embodiment hereof except as defined in the appended claims.

What is claimed is:

1. A process for preparing a thin elongated continuous and self-supporting film of an insoluble temperature resistant resin of the class consisting of polytetrahaloethylenes, halogen substituted cross-linked vinyls, and cross-linked polyethylene, which process comprises the steps of providing an electrically conductive base having a surface adherently coated with a coherent layer of said resin in the desired thinness, separating a portion of the coating from the base to expose a portion of the base surface, then immersing the base in an electrolyte that generates gas upon electrolysis, passing an electrolyzing current from said exposed surface portion to said electrolyte to generate substantial quantities of gas on said exposed surface portion adjacent the juncture of the separated coating portion with the unseparated adherent coating to loosen a section of said coating, and pulling the loosened section to pull off as a continuous strip all the adherent portion of the coating from the immersed section of the base during the electrolyzing.

2. A process for preparing a thin elongated continuous and self-supporting film of polytetrafluoroethylene resin, which process comprises the steps of providing an electrically conductive base having a surface adherently coated with a coherent layer of said resin in the desired thinness, separating a portion of the coating from the base to expose a portion of the base surface, then immersing the base in an electrolyte that generates gas upon electrolysis, passing an electrolyzing current from said exposed surface portion to said electrolyte to generate substantial quantities of gas on said exposed surface portion adjacent the juncture of the separated coating portion with the unseparated adherent coating to loosen a section of said coating, and pulling the loosened section to pull off as a continuous strip all the adherent portion of the coating from the immersed section of the base during the electrolyzing.

3. A process as described in claim 1 wherein there is prepared a thin elongated continuous and self-supporting film of halogen substituted cross-linked vinyl resin.

4. A process as described in claim 1 wherein there is prepared a thin elongated continuous and self-supporting film of cross-linked polyethylene.

5. In a process for preparing elongated continuous and self-supporting films less than about 1 mil thick of dielectric material comprising a polytetrahaloethylene resin binder, the steps of adherently coating a metal band with a correspondingly thick coherent layer of said dielectric material loosening a portion of the coating from the band to expose the surface of the band below it, contacting a gas-generating electrolyte with a section of the band including the portion carrying the loosened portion of the coating and the adjacent portion of unloosened coating, then electrolyzing the band as an electrode in the contacted electrolyte to generate substantial quantities of gas on the band surface at the juncture of the loosened and unloosened coating portions, and pulling the loosened portion to pull off as a continuous strip all the coating layer from the electrolyte-contacting section of the band during the electrolyzing.

6. The invention as defined by claim 5 in which the electrolytic treatment of the band is cathodic treatment in an aqueous electrolyte substantially inert to the dielectric material, and the generated gas is hydrogen.

7. The invention as defined by claim 5 in which the gas is electrolytically generated under a hydrostatic pressure of at least about 6 inches of electrolyte.

8. The invention as defined by claim 5 in which the loosened layer is pulled away from the surface of the band at an angle of between about 1 and 15 degrees.

9. The invention as defined by claim 5 in which the electrolytic treatment is effected by passing the coated base into an electrolyte in a generally downward direction and the pulling off of the loosened layer is effected in a direction that traps the generated gas at the stripping zone where the film leaves the base.

10. The invention as defined by claim 5 in which the electrolytic action is concentrated at the stripping zone where the film leaves the band, to reduce the dissipation of the electrolytic effect over the portion of the stripped base surface removed from the stripping zone.

11. The invention as defined by claim 10 in which the pulling off of the loosened layer is accomplished with the aid of a metal stripping knife having a stripping edge in contact with the layer and helping it separate from the band, the electrolyte-contacting portion of said knife being completely covered with insulation, except at said edge, and being connected as an electrolyzing electrode opposite in polarity with respect to the band.

12. In a process for preparing a thin, elongated, continuous and self-supporting band of polytetrahaloethylene resin containing dielectric particles, the steps of providing an electrically conductive base having a surface adherently coated with a coherent layer of said particle-containing resin, separating a portion of the layer from the base by scraping, then immersing the base in an electrolyte that generates gas at an electrolyzing electrode, electrolyzing the said exposed base portion in said electrolyte as such an electrode to loosen the layer from the base by generating substantial quantities of gas at the juncture of the separated and unseparated portion of the layer, and pulling the loosened section of the layer away from the base during the electrolyzing to pull off the entire layer as a continuous strip.

References Cited in the file of this patent

UNITED STATES PATENTS

| | | |
|---|---|---|
| 2,480,845 | Frager et al. | Sept. 6, 1949 |
| 2,528,445 | Markarian | Oct. 31, 1950 |